(12) United States Patent
Hu

(10) Patent No.: US 7,712,747 B2
(45) Date of Patent: May 11, 2010

(54) RETAINING ASSEMBLY

(76) Inventor: Bobby Hu, 8F, No. 536-1, Ta Chin Street, Taichung (TW)

( * ) Notice: Subject to any disclaimer, the term of this patent is extended or adjusted under 35 U.S.C. 154(b) by 918 days.

(21) Appl. No.: 11/470,009

(22) Filed: Sep. 5, 2006

(65) Prior Publication Data

US 2007/0013149 A1    Jan. 18, 2007

(30) Foreign Application Priority Data

Dec. 7, 2005  (TW) ............................... 94143181 A

(51) Int. Cl.
B23B 31/20 (2006.01)
F16B 21/20 (2006.01)

(52) U.S. Cl. .................. 279/43.1; 279/46.2; 24/563; 411/517

(58) Field of Classification Search ............... 279/43.1, 279/46.1, 46.2, 46.4, 46.7, 46.8; 206/478, 206/480, 488; 24/458, 563; 411/517, 520, 411/521, 525, 526; B23B 31/20; F16B 21/20
See application file for complete search history.

(56) References Cited

U.S. PATENT DOCUMENTS

| | | | | |
|---|---|---|---|---|
| 2,275,058 A * | 3/1942 | Draving | ...................... | 411/521 |
| 2,670,226 A * | 2/1954 | Becker | ...................... | 403/276 |
| 2,712,262 A * | 7/1955 | Knohl | ...................... | 411/521 |
| 2,950,937 A * | 8/1960 | Bedford, Jr. | ................ | 403/372 |
| 3,007,726 A * | 11/1961 | Parkin | ....................... | 403/372 |
| 3,027,609 A * | 4/1962 | Parkin et al. | ................ | 403/297 |
| 3,036,793 A * | 5/1962 | Becker | ..................... | 242/118.6 |
| 3,390,891 A * | 7/1968 | Stichhan | .................... | 279/23.1 |
| 3,483,789 A * | 12/1969 | Hugo | ......................... | 411/517 |
| 4,390,210 A * | 6/1983 | Wisniewski et al. | ..... | 297/452.59 |
| 4,490,576 A * | 12/1984 | Bolante et al. | ............. | 174/655 |
| 4,692,073 A * | 9/1987 | Martindell | .............. | 408/239 A |
| 4,775,273 A * | 10/1988 | Bauer | ......................... | 411/517 |
| 4,885,429 A * | 12/1989 | Schnittker | ................... | 174/668 |
| 5,803,692 A * | 9/1998 | Postadan | .................... | 411/526 |
| 6,098,504 A * | 8/2000 | Hu | ............................. | 81/125 |
| 6,170,363 B1 * | 1/2001 | Hu | ............................. | 81/125 |
| 6,443,462 B2 * | 9/2002 | Tempest | ..................... | 279/131 |
| 6,688,826 B2 * | 2/2004 | Agha et al. | ................. | 411/352 |
| 2003/0215307 A1 * | 11/2003 | Markiewitz et al. | ........ | 411/526 |

* cited by examiner

Primary Examiner—Eric A Gates
(74) Attorney, Agent, or Firm—Alan Kamrath; Kamrath & Associates PA

(57) ABSTRACT

A retaining assembly includes a body and a retainer. The body includes a compartment defined in an end thereof. The compartment is defined by a perimeter wall and an end wall. A coupling hole is defined in the end wall for receiving a tool. The retainer is mounted in the compartment of the body and has a through-hole aligned with the coupling hole of the body. The retainer further includes at least one resilient positioning portion abutting against the perimeter wall of the body for retaining the retainer in the compartment of the body. The retainer further includes at least one resilient clamping portion extending into the coupling hole of the body for pressing against at least one face of the tool received in the coupling hole of the body.

19 Claims, 7 Drawing Sheets

RETAINING ASSEMBLY

BACKGROUND OF THE INVENTION

1. Field of the Invention

The present invention relates to a retaining assembly and, more particularly, to a retaining assembly for retaining a driving member such as a screwdriver bit or the like.

2. Description of the Related Art

FIG. 6 of the drawings illustrates a conventional sleeve 1 having a compartment 2. An end of the sleeve 1 is coupled to a handle of a screwdriver. A member, such as a screwdriver bit is mounted into the compartment 2 and retained in place by a C-clip 3. In assembly, the C-clip 3 is compressed by a pair of pliers and placed into the compartment 2 in a position aligned with an annular groove 4 in a perimeter wall defining the compartment 2. Finally, the C-clip 3 is inserted into the annular groove 4 and then released. The resiliency of the C-clip 3 is not affected when the diameter of the compartment 2 is large enough, for the C-clip 3 deforms in an allowable extent during the assembling procedure. However, if the diameter of the compartment 2 is too small, the C-clip 3 is deformed beyond its tolerable limit such that permanent deformation occurs. As a result, the clamping force imparted by the C-clip 3 to the member received in the compartment 2 is not uniform or insufficient to reliably retain the member in place.

FIG. 7 shows a conventional shock-proof retainer 7 that is mounted into a bottom of a compartment 6 in a sleeve 5. However, undesired shift occurs easily while mounting the retainer 7 into the deepest portion of the compartment 6. The mounting procedure is more difficult when the compartment 6 is small in diameter. Further, the retainer 7 occupies a certain space in the compartment 6 and, thus, adversely affects the function and effect of retaining.

SUMMARY OF THE INVENTION

In accordance with an aspect of the present invention, a retaining assembly comprises a body and a retainer. The body includes a compartment defined in an end thereof. The compartment is defined by a perimeter wall and an end wall. A coupling hole is defined in the end wall and adapted for receiving a tool. The retainer is mounted in the compartment of the body and has a through-hole aligned with the coupling hole of the body. The retainer further includes at least one resilient positioning portion abutting against the perimeter wall of the body for retaining the retainer in the compartment of the body. The retainer further includes at least one resilient clamping portion extending into the coupling hole of the body and adapted for pressing against at least one face of the tool received in the coupling hole of the body.

Preferably, the retainer further includes at least one restraining portion abutting against the end wall of the body.

In an example, the retainer includes two diametrically disposed restraining portions extending radially outward and having outer edges, with a distance between the outer edges of the diametrically disposed restraining portions being substantially the same as a diameter of the compartment of the body.

Preferably, the resilient positioning portion extends radially outward at an incline and is in contact with the perimeter wall defining the compartment of the body.

Preferably, the at least one resilient clamping portion includes a distal end having an inclined face extending radially outward.

Preferably, the retainer includes a plurality of pairs of diametrically disposed resilient positioning portions. Each pair of the diametrically disposed resilient positioning portions have outer edges, with a distance between the outer edges of each pair of the diametrically disposed resilient positioning portions being slightly greater than the diameter of the compartment of the body.

Preferably, a perimeter wall defining the coupling hole includes a plurality of faces, and at least one of the faces of the perimeter wall defining the coupling hole is aligned with the at least one resilient clamping portion.

Preferably, the coupling hole and the through-hole of the retainer are hexagonal.

Preferably, a perimeter wall defining the coupling hole includes at least one recess for receiving the at least one resilient clamping portion of the retainer.

Preferably, two resilient clamping portions are provided and diametrically disposed.

In accordance with a second aspect of the present invention, a retaining assembly comprises a body and a retainer. The body includes a compartment defined in an end thereof. The compartment is defined by a perimeter wall and an end wall. A coupling hole is defined in the end wall and adapted for receiving a tool. The retainer includes a ring body mounted in the compartment of the body. The ring body has a through-hole aligned with the coupling hole of the body. At least one resilient positioning portion extends from the ring body and is in frictional contact with the perimeter wall of the body for retaining the retainer in the compartment of the body. Two diametrically disposed resilient clamping portions extend from the ring body into the coupling hole of the body and are adapted for clamping a face of the tool received in the coupling hole of the body.

Preferably, the retainer further includes a pair of diametrically disposed restraining portions extending radially outward and having outer edges abutting against the perimeter wall defining the compartment of the body, with a distance between the outer edges of the resilient positioning portions being slightly greater than the diameter of the compartment of the body.

Preferably, each restraining positioning portion abuts against the end wall defining the compartment of the body.

Preferably, a perimeter wall defining the coupling hole includes a plurality of faces, and two of the faces of the perimeter wall defining the coupling hole are aligned with the resilient clamping portions.

Preferably, the coupling hole and the through-hole of the retainer are hexagonal.

Preferably, a perimeter wall defining the coupling hole includes two diametrically disposed recesses for receiving the resilient clamping portions of the retainer.

Preferably, each resilient clamping portion includes a distal end having an inclined face extending radially outward.

Other objectives, advantages, and features of the invention will become more apparent from the following detailed description when taken in conjunction with the accompanying drawings.

DETAILED DESCRIPTION OF THE PREFERRED EMBODIMENT

Figure 1:
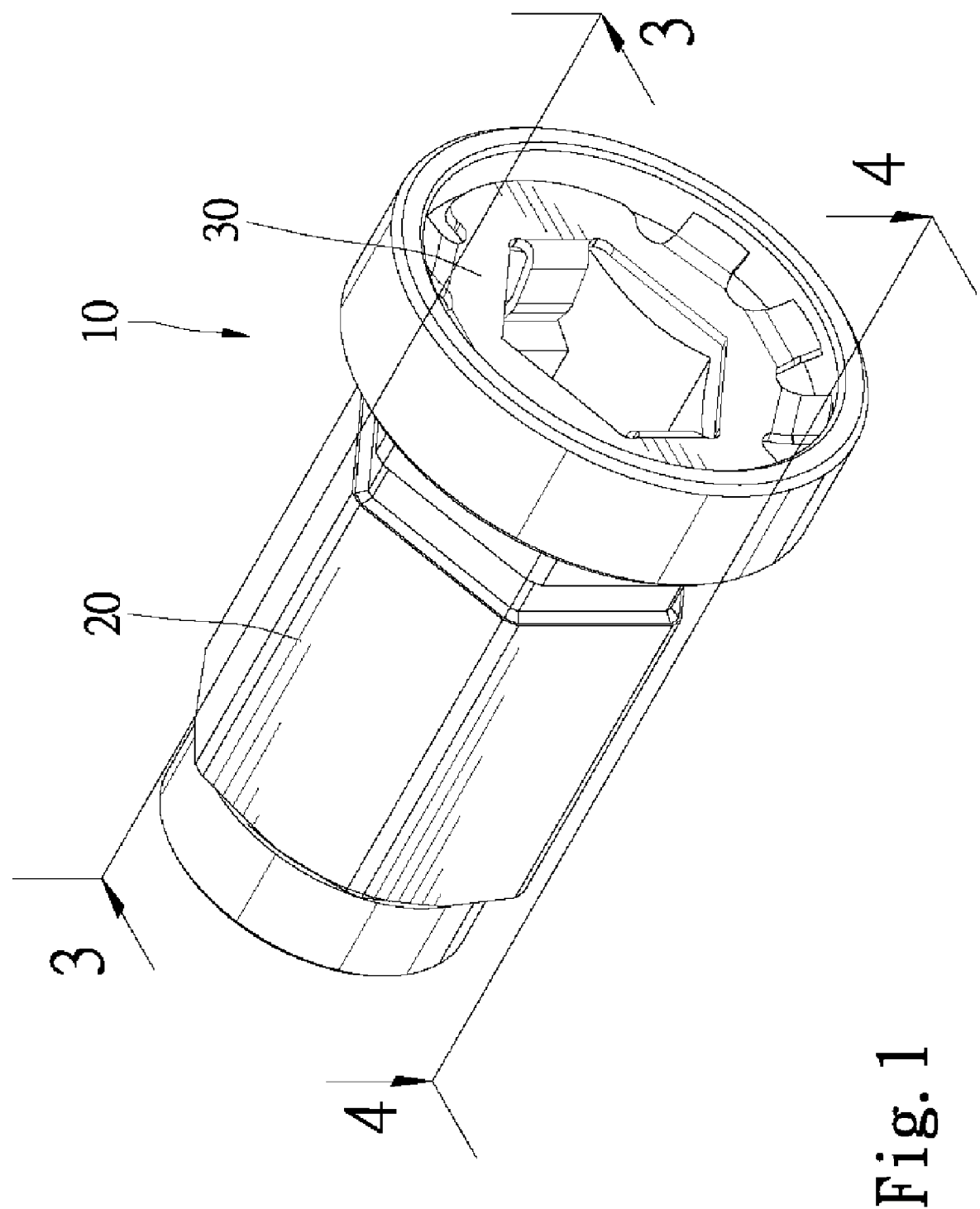
FIG. 1 is a perspective view of a retaining assembly in accordance with the present invention.
Figure 2:
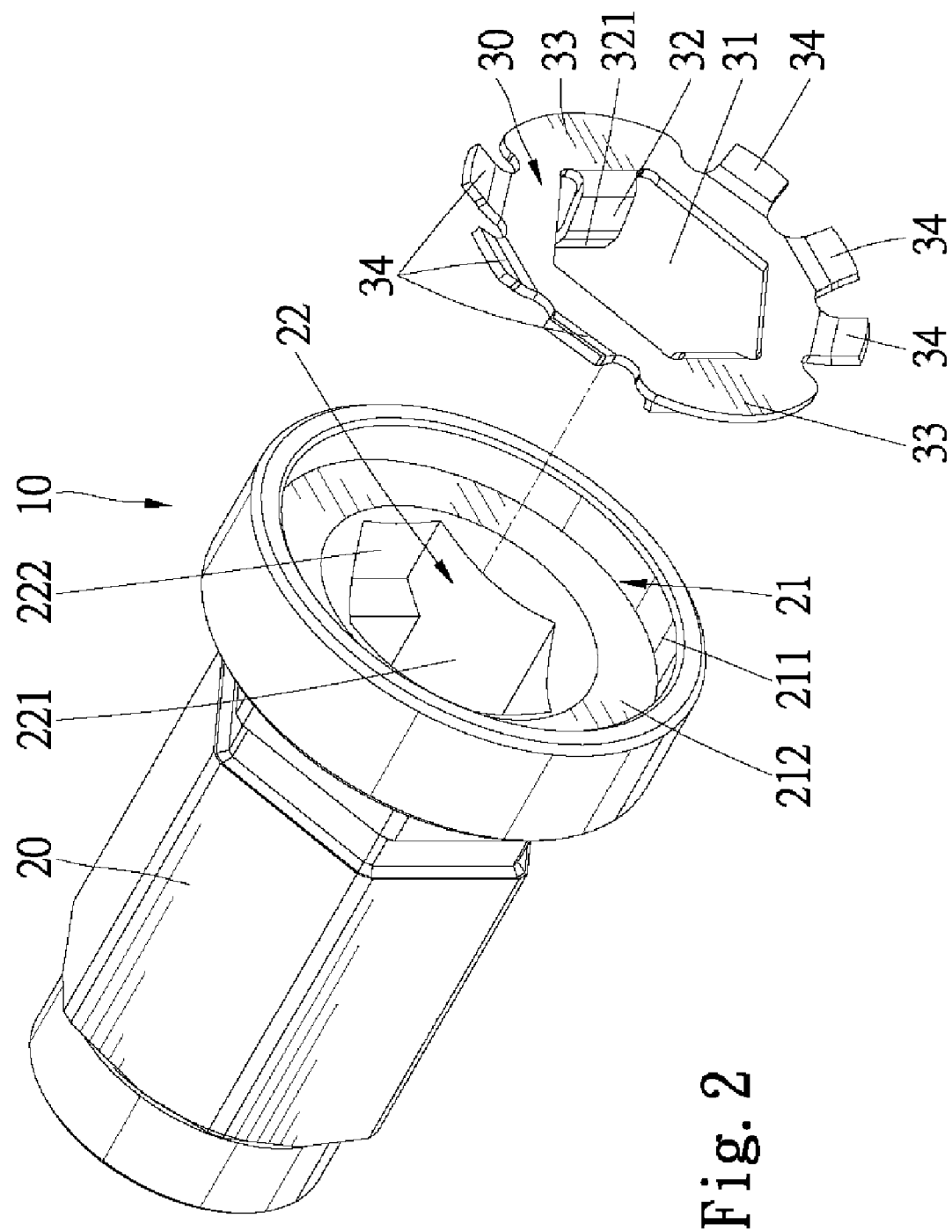
FIG. 2 is an exploded perspective view of the retaining assembly in accordance with the present invention.
Figure 3:
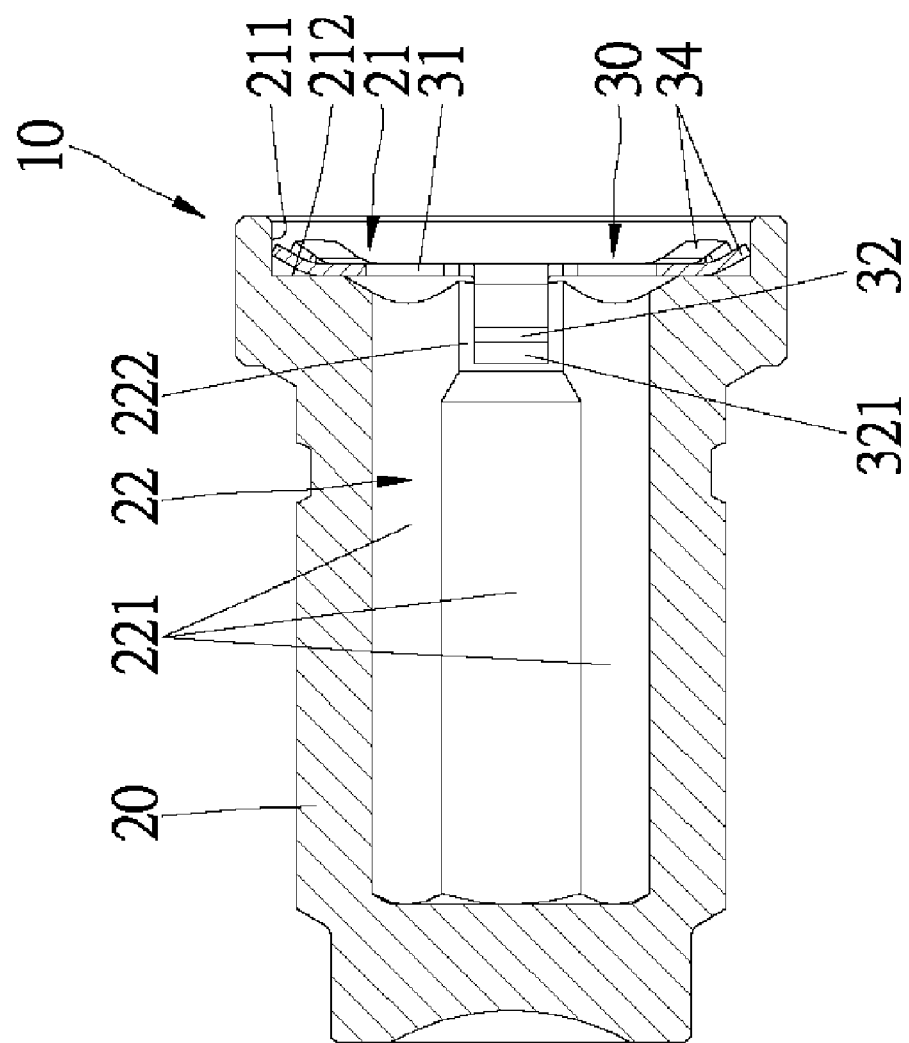
FIG. 3 is a sectional view taken along plane 3-3 in FIG. 1.

Referring to FIGS. 1 through 3, a retaining assembly 10 in accordance with the present invention comprises a body 20 and a retainer 30. The body 20 includes a compartment 21 in an end thereof. In this example, the compartment 21 is cylindrical and defined by a perimeter wall 211 and an end wall 212. A coupling hole 22 is defined in the end wall 212 defining the compartment 21. Preferably, the coupling hole 22 is non-circular in section. An end of a tool, such as a shank (not labeled) of a screwdriver bit (not labeled, see FIG. 5) is releasably engaged in the coupling hole 22. In this example, a perimeter wall defining the coupling hole 22 is hexagonal and includes six faces 221 for contacting with six faces of the shank of the screwdriver bit.

The retainer 30 is mounted in the compartment 21 of the body 20 for holding the shank of the screwdriver bit. The retainer 30 is substantially a ring body including a through-hole 31 having a sectional shape corresponding to that of the coupling hole 22 of the body 20. The shank of the screwdriver bit can be extended into the coupling hole 22 of the body 20 via the through-hole 31 of the retainer 30. The retainer 30 further includes two resilient clamping portions 32 extending from the ring body in a longitudinal direction of the through-hole 31. When the retainer 30 is mounted in the compartment 21 of the body 20, the resilient clamping portions 32 of the retainer 30 extend into the coupling hole 22 of the body 20 and are preferably aligned with two of the faces 221 defining the coupling hole 22. The resilient clamping portions 32 of the retainer 30 are in surface contact with the shank of the screwdriver bit, providing a reliable clamping effect for the shank of the screwdriver bit.

Preferably, each resilient clamping portion 32 includes a distal end having an inclined face 321 that extends radially outward. The inclined face 321 of the resilient clamping portions 32 allow easy removal of the shank of the screwdriver bit from the coupling hole 22 of the body 20. In this example, the resilient clamping portions 32 are diametrically disposed to provide an enhanced retaining effect. Further, the perimeter wall defining the coupling hole 22 of the body 20 includes two recesses 222 respectively aligned with the resilient clamping portions 32. The recesses 222 receive the resilient clamping portions 32 and allow the resilient clamping portions 32 to move radially outward in the recesses 222 while mounting the shank of the screwdriver bit into the coupling hole 22.

In this example, the retainer 30 further includes two symmetrically disposed restraining portions 33. Each restraining portion 33 extends radially outward from a position of the ring body from which an associated one of the resilient clamping portions 32 extends longitudinally. Preferably, the restraining portions 33 are diametrically disposed, and a maximum distance between outer edges of the restraining portions 33 is substantially the same as a diameter of the compartment 21. Hence, when mounting the retainer 30 into the compartment 21 of the body 20, the restraining portions 33 are in contact with and slide along the perimeter wall 211 to the end wall 212 without the risk of undesired shifting or skew mounting. When the retainer 30 comes in contact with the end wall 212 defining the compartment 21, the restraining portions 33 are in surface contact with the end wall 212 to avoid skew mounting.

The retainer 30 may further include a plurality of resilient positioning portions 34 between the restraining portions 33. In this example, three pairs of resilient positioning portions 34 are symmetrically arranged between the restraining portions 33. A distance between outer edges of each pair of positioning portions 34 is slightly greater than the diameter of the compartment 21. Further, each resilient positioning portion 34 extends radially outward at an incline away from the resilient clamping portions 32. Hence, when the retainer 30 is smoothly moved into the compartment 21 and comes in contact with the end wall 212 defining the compartment 21, the inclined resilient positioning portions 34 reliably press against the perimeter wall 211 defining the compartment 21, thereby positioning the retainer 30 in the compartment 21 of the body 20.

Figure 4:
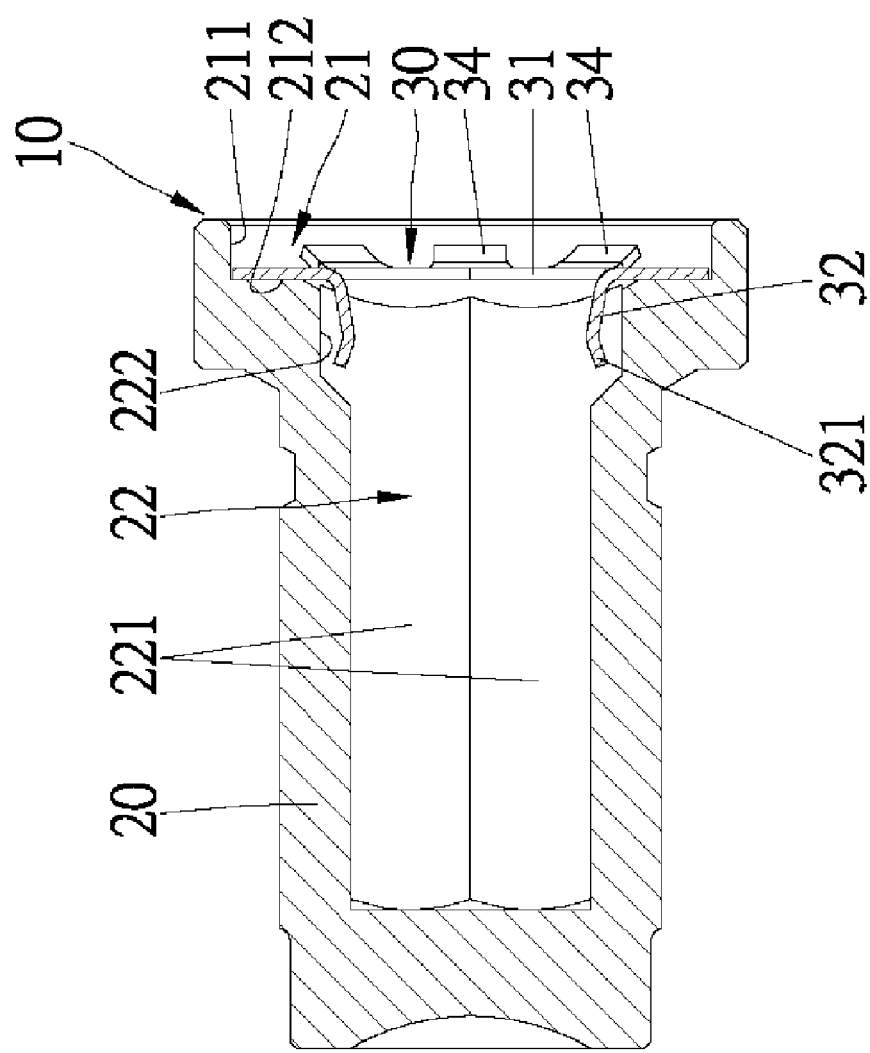
FIG. 4 is a sectional view taken along plane 4-4 in FIG. 1.

Referring to FIGS. 2 through 4, in assembly, the retainer 30 is placed into the compartment 21 with the resilient clamping portions 32 of the retainer 30 aligned with the recesses 222 of the coupling hole 22. The restraining portions 33 abut against the end wall 212 defining the compartment 21, and the resilient positioning portions 34 press against the perimeter wall 211 defining the compartment 21. Reliable positioning of the retainer 30 in the compartment 21 of the body 20 is obtained through a simple, rapid assembling procedure without the risk of excessive deformation of the retainer 30. The retainer 30 is thus capable of performing its clamping function normally without the risk of non-uniform clamping forces. Further, the retainer 30 received in the compartment 21 of the body 20 occupies a smaller space regardless of the diameter of the coupling hole 22 of the body 20. The problems encountered in mounting a retainer in a small hole are avoided.

Figure 5:
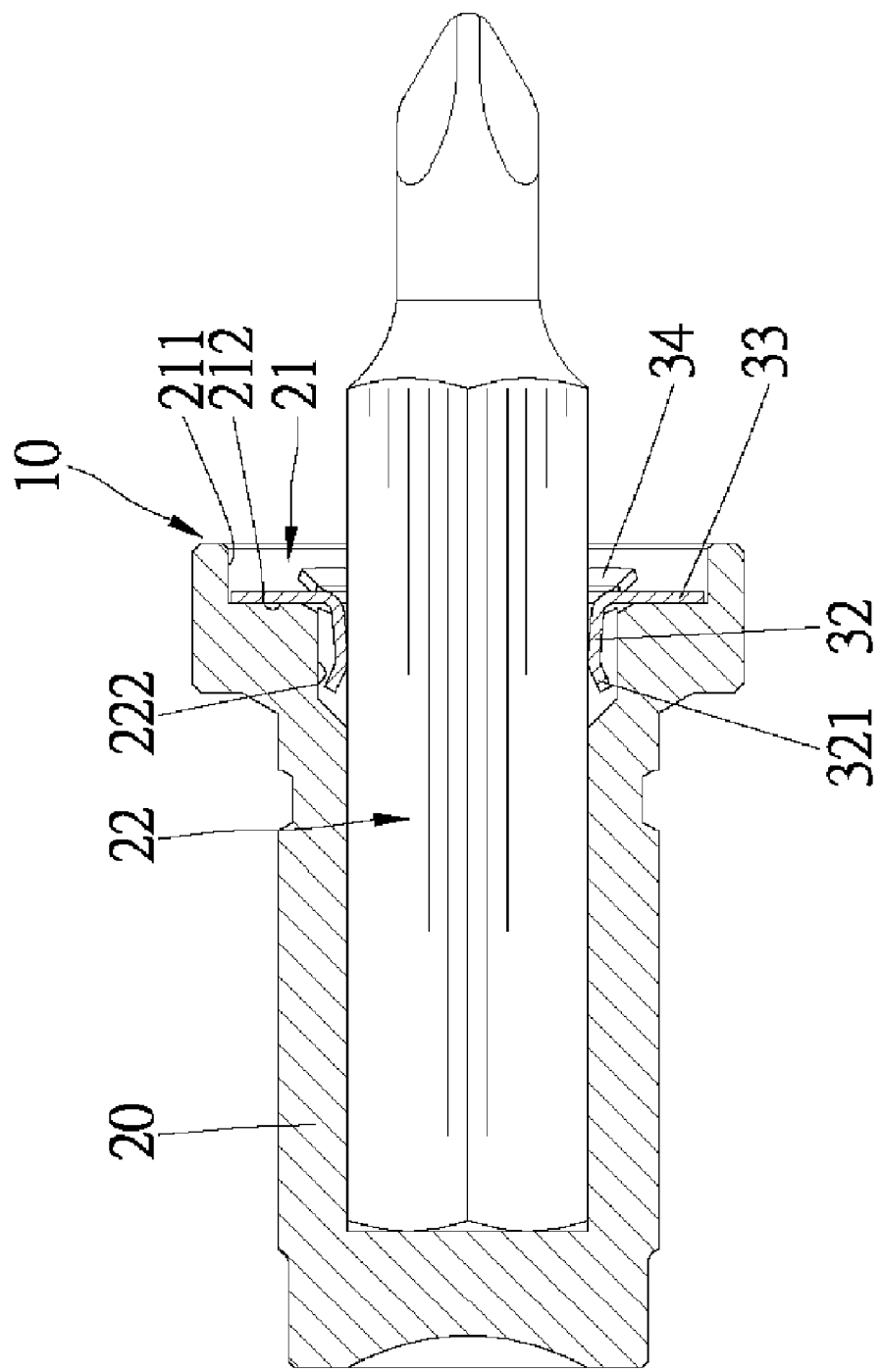
FIG. 5 is a sectional view similar to FIG. 4, illustrating use of the retaining assembly in accordance with the present invention.
Figure 6:
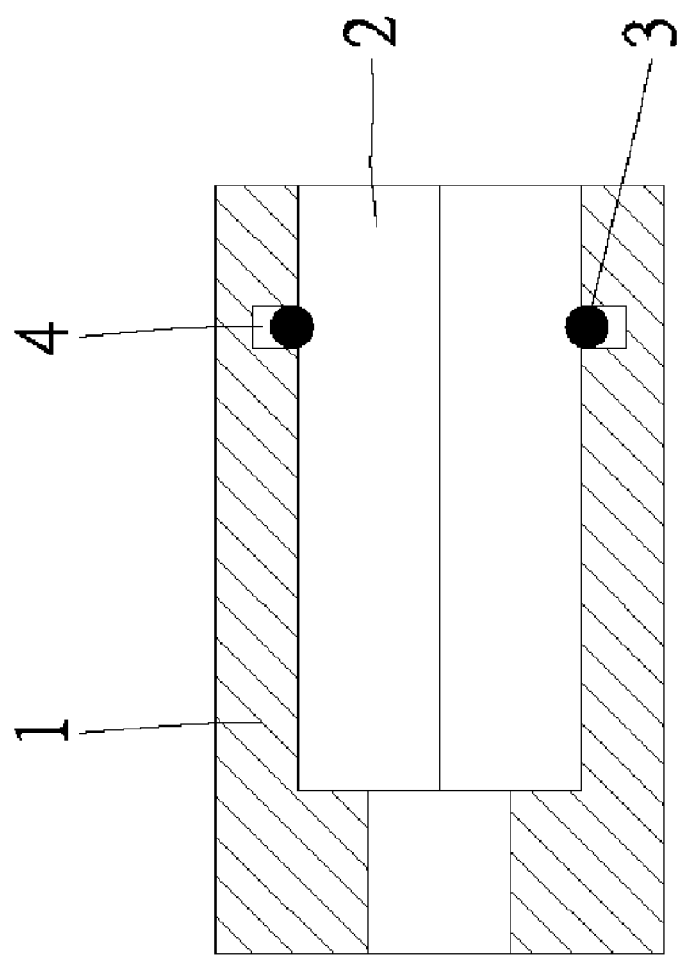
FIG. 6 is a sectional view of a sleeve with a conventional retainer.
Figure 7:
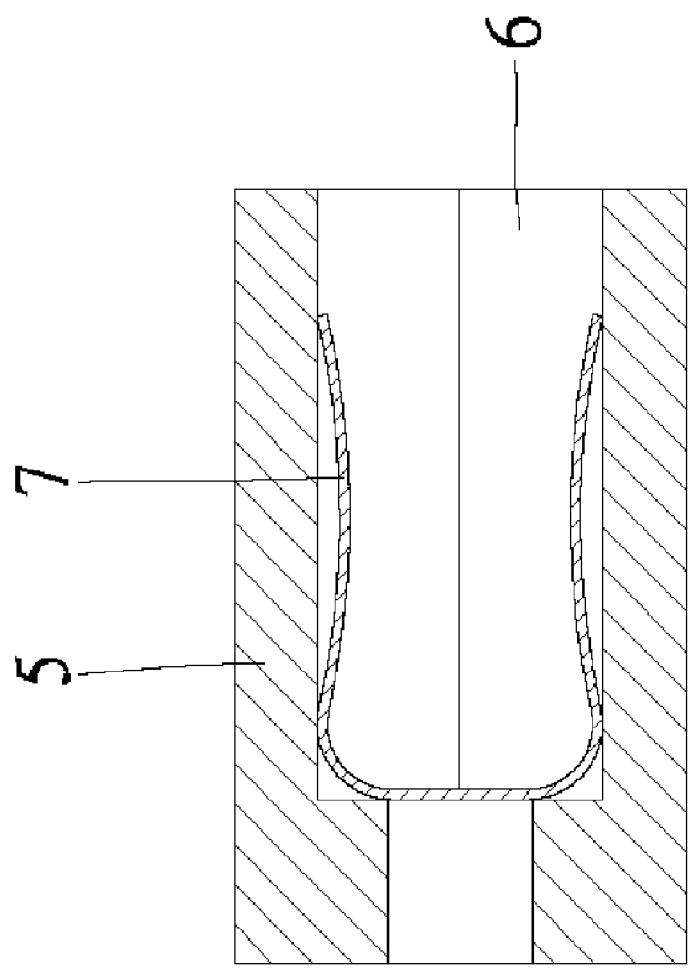
FIG. 7 is a sectional view of a sleeve with another conventional retainer.

Referring to FIG. 5, when inserting a shank of a screwdriver bit into the coupling hole 22 of the body 20, the resilient clamping portions 32 of the retainer 30 are moved radially outward in the recesses 222 and then return to their original position for clamping the shank of the screwdriver bit. After mounting, the resilient clamping portions 32 of the retainer 30 are in surface contact with the shank of the screwdriver bit and exert a radially inward force to the faces of the shank. A reliable clamping effect is thus provided. Further, since the resilient clamping portions 32 of the retainer 30 are moved radially outward in the recesses 222 while inserting the shank of the screwdriver bit into the coupling hole 22 of the body 20, undesired deformation of the resilient clamping portions 32 resulting from forcible insertion is avoided. Namely, the clamping effect of the resilient clamping portions 32 is assured.

When removing the shank of the screwdriver bit from the coupling hole 22 of the body 20, the inclined faces 321 of the resilient clamping portions 32 allow easy removal of the shank without the risk of getting stuck. Further, since the retainer 30 is reliably retained in the compartment 21 of the body 20 by the frictional contact between the resilient positioning portions 34 of the retainer 30 and the perimeter wall 211 defining the compartment 21, the retainer 30 will not be removed together with the screwdriver bit.

Although a specific embodiment has been illustrated and described, numerous modifications and variations are still possible. The scope of the invention is limited by the accompanying claims.

What is claimed is:

1. A retaining assembly comprising:
   body including a compartment defined in an end thereof, the compartment being defined by a perimeter wall and an end wall, a coupling hole being defined in the end wall and adapted for receiving a tool; and a retainer mounted in the compartment of the body, the retainer having a through-hole aligned with the coupling hole of the body, the retainer further including at least one resilient positioning portion abutting against the perimeter wall of the body for retaining the retainer in the compartment of the body, the retainer further including at least one resilient clamping portion extending into the coupling hole of the body and adapted for pressing against at least one face of the tool received in the coupling hole of the body, wherein a perimeter wall defining the coupling hole includes at least one recess for receiving said at least one resilient clamping portion of the retainer.

2. The retaining assembly as claimed in claim 1 wherein the retainer further includes at least one restraining portion abutting against the end wall of the body.

3. The retaining assembly as claimed in claim 1 wherein the retainer further includes two diametrically disposed restraining portions extending radially outward and having outer edges, with a distance between the outer edges of the diametrically disposed restraining portions being substantially the same as a diameter of the compartment of the body.

4. The retaining assembly as claimed in claim 1 wherein the retainer includes a plurality of pairs of diametrically disposed resilient positioning portions, each of said plurality of pairs of diametrically disposed resilient positioning portions having outer edges, with a distance between the outer edges of each said plurality of pairs of diametrically disposed resilient positioning portions being slightly greater than the diameter of the compartment of the body.

5. The retaining assembly as claimed in claim 1 wherein said at least one resilient positioning portion extends radially outward at an incline and is in contact with the perimeter wall defining the compartment of the body.

6. The retaining assembly as claimed in claim 1 wherein the perimeter wall defining the coupling hole includes a plurality of faces, and wherein at least one of the faces of the perimeter wall defining the coupling hole is aligned with said at least one resilient clamping portion.

7. The retaining assembly as claimed in claim 6 wherein the coupling hole and the through-hole of the retainer are hexagonal.

8. The retaining assembly as claimed in claim 1 wherein the number of said at least one resilient clamping portion is two, said two resilient clamping portions being diametrically disposed.

9. The retaining assembly as claimed in claim 8 wherein said at least one resilient clamping portion includes a distal end having an inclined face extending radially outward.

10. A retaining assembly comprising:
a body including a compartment defined in an end thereof, the compartment being defined by a perimeter wall and an end wall, a coupling hole being defined us in the end wall and adapted for receiving a tool, wherein a perimeter wall defining the coupling hole includes a plurality of faces, and wherein two of the plurality of faces of the perimeter wall defining the coupling hole are aligned with the resilient clamping portions; and a retainer including a ring body mounted in the compartment of the body, the ring body having a through-hole aligned with the coupling hole of the body, at least one resilient positioning portion extending from the ring body and being in frictional contact with the perimeter wall of the body for retaining the retainer in the compartment of the body, two diametrically disposed resilient clamping portions extending from the ring body into the coupling hole of the body and being adapted for clamping the tool received in the coupling hole of the body.

11. The retaining assembly as claimed in claim 10 wherein the perimeter wall defining the coupling hole includes at least one recess for receiving said at least one resilient clamping portion of the retainer.

12. The retaining assembly as claimed in claim 10 wherein the retainer further includes a pair of diametrically disposed restraining portions extending radially outward and having outer edges abutting against the perimeter wall defining the compartment of the body, with a distance between the outer edges of the restraining portions being slightly greater than a diameter of the compartment of the body.

13. The retaining assembly as claimed in claim 12 wherein each said restraining portion abuts against the end wall defining the compartment of the body.

14. The retaining assembly as claimed in claim 13 wherein each said resilient clamping portion includes a distal end having an inclined face extending radially outward.

15. The retaining assembly as claimed in claim 12 wherein a perimeter wall defining the coupling hole includes two diametrically disposed recesses for receiving the resilient clamping portions of the retainer.

16. The retaining assembly as claimed in claim 12 wherein each said resilient clamping portion includes a distal end having an inclined face extending radially outward.

17. The retaining assembly as claimed in claim 10 wherein the coupling hole and the through-hole of the retainer are hexagonal.

18. The retaining assembly as claimed in claim 10 wherein the perimeter wall defining the coupling hole includes two diametrically disposed recesses for receiving the resilient clamping portions of the retainer.

19. A retaining assembly comprising:
a body including a compartment defined in an end thereof, the compartment being defined by a perimeter wall and an end wall, a coupling hole being defined in the end wall and adapted for receiving a tool; and a retainer including a ring body mounted in the compartment of the body, the ring body having a through-hole aligned with the coupling hole of the body, at least one resilient positioning portion extending from the ring body and being in frictional contact with the perimeter wall of the body for retaining the retainer in the compartment of the body, two diametrically disposed resilient clam in portions extending from the ring body into the coupling hole of the body and being adapted for clamping the tool received in the coupling hole of the body, wherein each said resilient clamping portion includes a distal end having an inclined face extending radially outward.

* * * * *